Figure 1A:
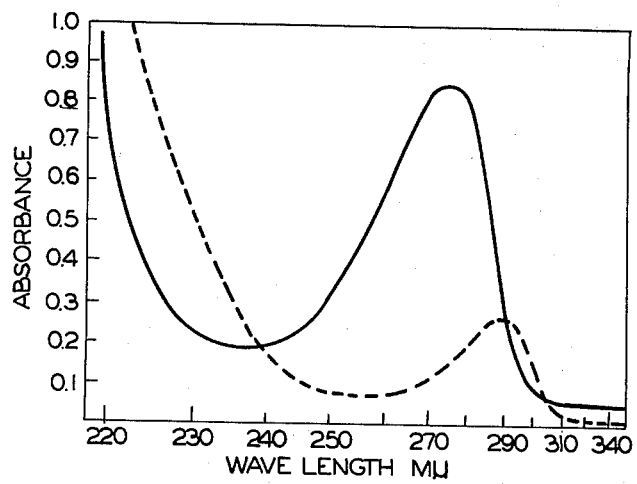

INVENTORS.
FREDERICK L. CRANE
ROBERT L. LESTER
DAVID E. GREEN

BY Adams, Forward and McLean

ATTORNEYS.

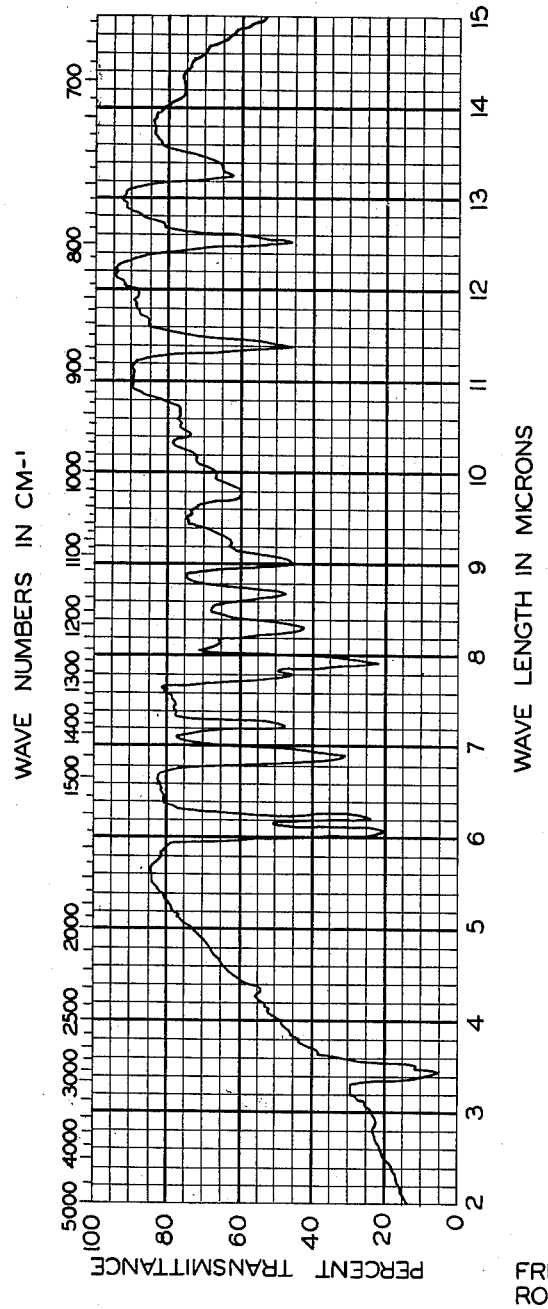

3,162,654
TETRA-SUBSTITUTED BENZOQUINONES AND
DERIVATIVES OF THE SAME
Frederick L. Crane, Robert L. Lester, and David E. Green, Madison, Wis., assignors to Wisconsin Alumni Research Foundation, Madison, Wis., a corporation of Wisconsin
Filed Sept. 3, 1958, Ser. No. 758,838
5 Claims. (Cl. 260—396)

The present invention relates to novel products and processes of preparing the same and more specifically to a new type quinone identified by the term coenzyme Q. The quinone acts as a coenzyme by undergoing cyclic oxidation and reduction during substrate oxidation in mitochondria.

Materials with high respiratory rates generally are good sources from which coenzyme Q can be obtained. The quinone has been obtained, for example, from beef heart mitochondria, beef liver mitochondria, pigeon breast muscle cyclophorase, *N. crassa*, torula, Azotobacter, baker's yeast, etc. Saponification of these materials with aqueous alkali metal hydroxide in a solvent such as ethanol in the presence of pyrogallol followed by extraction of the saponified mixture with isooctane or heptane with or without column chromatography of the extract, is one preferred general procedure. Pyrogallol is employed as the quinone is irreversibly destroyed in alkaline solutions unless the saponification medium contains pyrogallol or equivalent antioxidant. Where chromatography is employed, e.g. on alumina, magnesium silicate (Forisil), sodium aluminosilicate (Decalso), fuller's earth, etc., the use of isooctane or heptane solutions with elution with a slightly more polar solvent mixture, e.g. 5 percent ethyl ether isooctane, is also a preferred general procedure. The coenzyme Q preparations also can be purified by recrystallization from ethanol, methanol, amyl alcohol, ethyl acetate, acetone or acetic acid.

Extraction with heptane or isooctane is preferred over ether, petroleum ether, pentane and the like as these latter low boiling solvents extract considerably more unwanted or undesirable material. The major impurities with heptane and isooctane extraction are the carotenoids and sterols which luckily can be removed from the quinone by chromatographic techniques and/or differential crystallization.

Coenzyme Q preparations derived from different sources under similar or different methods are basically similar in essential properties as noted below. All products are yellow-orange, neutral, low melting solids, insoluble in water and soluble in organic solvents including pentane, heptane (n-heptane) isooctane (2,2,4-trimethylpentane), petroleum ether, cyclohexane, benzene, toluene, ethyl ether, acetone, lower alkanols (e.g. methyl, ethyl and amyl alcohols), ethyl acetate, acetic acid, chloroform, carbon tetrachloride and pyridine, with the greatest solubility being in the non-polar (hydrocarbon) solvents.

The yellow color of the quinone is bleached by reducing agents, e.g. $KBH_4$, ascorbic acid, zinc, etc., and the resulting reduced compound is oxidized slowly in air and regenerated rapidly in the presence of $Ag_2O$ to coenzyme Q, i.e. the oxidized form of coenzyme Q. The chromatographic properties on gel-type precipitated sodium aluminosilicate (available under the trademark "Decalso") are also similar. Coenzyme Q in isooctane solution, for example, is adsorbed on Decalso and eluted with dilute ethereal (3–10% ethyl ether) solutions of isooctane. All coenzyme Q preparations also reactivate a coenzyme Q depleted succinoxidase system.

Figure 1B:
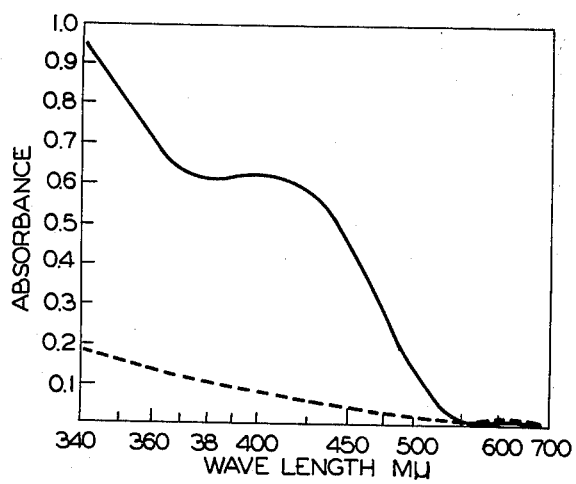

The ultraviolet absorption spectra for coenzyme Q is also qualitatively identical throughout the visible region, all preparations in ethanol having maxima at about 275 m$\mu$ with a broader band at 405 m$\mu$. These maxima disappear upon borohydride ($KBH_4$) reduction and a single maximum of lower intensity appears at 290 m$\mu$. See FIGURE 1, *a* and *b*, where the solid line gives the spectrum for the oxidized form of coenzyme Q and the broken line the spectrum for the reduced form of coenzyme Q. Spectral evidence also indicates intermediate stages in the reduction. When coenzyme Q in ethanol, for example, is shaken with solid $KBH_4$, the 275 m$\mu$ peak disappears and peaks appear at 248 m$\mu$ and 312 m$\mu$. These latter two bands disappear rapidly followed by the formation of the single stable 290 m$\mu$ band. Also, in the visible range when an ethanolic solution of coenzyme Q is shaken with small amounts of $KBH_4$, a pinkish color appears before the yellow color is bleached. The pinkish color appears again upon shaking the bleached solution in air. When this reduction in ethanol with $KBH_4$ is observed in a recording spectrophotometer a great increase in extinction occurs immediately throughout the visible region with the transient formation of two sharp bands appearing at 420 and 442 m$\mu$. The extinction then drops rapidly until the bleached state is reached. This characteristic is also observed in all coenzyme Q preparations regardless of source.

When coenzyme Q is hydrogenated at room temperature and atmospheric pressure in a Warburg monometer in ethyl alcohol with palladium on charcoal as catalyst (2–3 mg. Pd./mg. quinone), hydrogen uptake is instantaneous and complete after several minutes, the values ranging from about 1.2 to 1.3 moles $H_2$ absorbed/100 g. quinone. Under similar conditions using platinum oxide in ethanol, a slightly higher value was obtained.

The infrared spectra of coenzyme Q obtained from various sources by similar or different methods is also qualitatively identical. This spectra is illustrated in FIGURE II using KBr pellets. As shown here, coenzyme Q exhibits characteristic absorption bands in the infrared region of the spectrum at the following wave lengths expressed in microns: 3.45; 3.52; 4.37; 6.08; 6.20; 6.90; 7.21; 7.77; 7.92; 8.32; 8.67; 9.03; 9.78; 10.42; 11.39; 12.55; 13.27.

Coenzyme Q in the reduced form forms an acetate (diacetate) ester which can be prepared as follows: 400 mg. of coenzyme Q, obtained from beef heart mitochondria, 400 mg. of zinc dust, 10 ml. of acetic anhydride and 2 ml. of triethylamine were warmed for about 5–10 minutes. The mixture was transferred to a separatory funnel with 50 ml. of cyclohexane after filtering through glass wool. The cyclohexane phase was washed twice with 25 ml. volumes of 0.3 N HCl and washed three times with 50 ml. of water. The solvent was distilled off in vacuo and the semi-solid product was dissolved with 20 ml. of hot absolute ethanol and allowed to stand at 5° C. After two days the practically white precipitate which formed was filtered by suction and redissolved in 10 ml. of absolute ethanol. After standing overnight at room temperature the diacetate precipitated and a further small amount was obtained after standing at 5° C. for two days. After removal of the mother liquor by centrifugation and the drying of the precipitate in vacuo, the diacetate derivative of coenzyme Q-10 (see below) was obtained as a white product which softens at 39° C. and melts at 40° C.

Absorption spectra on the oxidized and reduced forms of coenzyme Q are consistent with the presence of an $\alpha,\beta$-unsaturated carbonyl function undergoing reversible oxidation and reduction. This indicates that coenzyme Q is a quinone and a para-quinone because of the color. A tetra-substituted quinone is also indicated as coenzyme Q gives a negative Craven test. Other evidence including solubility in lipid solvents also points to the presence of a quinonoid group or nucleus with a fatty (unsaturated aliphatic) side chain. Permanganate oxidation of coenzyme Q (using 1% $KMnO_4$ in 0.3 M KOH) yields levulinic acid along with succinic acid and other degradation products including partially oxidized products. The levulinic acid (identified as the 2,4-dinitrophenylhydrazone) points to the presence of isoprenoid

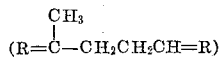

elements in the side chain of coenzyme Q.

The differences in melting points and $R_f$ values (see Table I below) as well as noted differences in solubility properties in the lower alkanols (e.g. at different temperatures) confirms that the quinones (coenzyme Q) obtained from the sources described below are different. Present evidence shows them to be a homologous series of compounds with the same quinonoid chromophore, with two alkoxyl substituents and a long side chain which is isoprenoid in character. The compounds appear, at least for the most part, to differ only in the length of this chain and specifically in the number of five carbon (isoprene) units. This is illustrated in Table I giving properties of various coenzyme preparations obtained from different sources.

TABLE I

| Source | Coenzyme | Molecular Weight | Empirical Formula | Melting Point | $R_f$ Value |
|---|---|---|---|---|---|
| Beef Heart | Q-10 | 849.3 | $C_{59}H_{88}O_4$ | 49.9 | 0.27 |
| T. utilis (high m. pt. form) | Q-9 | 781.2 | $C_{54}H_{80}O_4$ | 45.2 | 0.36 |
| A. vinelandi | Q-8 | 713.1 | $C_{49}H_{72}O_4$ | 37.0 | 0.42 |
| T. utilis (low m. pt. form) | Q-7 | 644.9 | $C_{43}H_{64}O_4$ | 30.5 | 0.49 |

$R_f$ values obtained in 8/2 [v./v.] n-propanol/$H_2O$ with reverse-phase paper chromatography.

It would be consistent with the data in the above table to assume that the alkoxyl groups are methoxy groups and that coenzymes Q-10, Q-9, Q-8 and Q-7 have, respectively, 10, 9, 8 and 7 isoprene ($C_5H_8$) units. The coenzyme Q isolated from baker's yeast is the next lower homologue containing 6 isoprene units, i.e. is coenzyme Q-6. It has a melting point of 16° C. and a molecular weight (by $FeCl_3$-dipyridyl titration) of about 590. The chemical analysis, given below in Table II, has shown all crystalline coenzyme preparations to contain no nitrogen, sulfur or halides.

TABLE II

| Compound | Q-10 | Q-9 | Q-8 | Q-7 |
|---|---|---|---|---|
| Carbon: | | | | |
| Theory | 82.02 | 81.48 | 80.85 | 80.07 |
| Found | 82.24 | 81.44 | 81.01 | 79.48 |
| Hydrogen: | | | | |
| Theory | 10.44 | 10.32 | 10.18 | 10.00 |
| Found | 10.38 | 10.11 | 9.83 | 9.84 |

Tests have also shown coenzyme Q to have no vitamin K or vitamin E activity and not to restore the prothrombin level of rats which have been treated with warfarin.

Methoxyl groups, as noted above, were found to be present in all coenzyme Q preparations (as judged by the Ziesel determination) and the values obtained are reported in Table III. Another constant feature of all quinones was the presence of a considerable number of branched methyl groups as measured by Kuhn-Roth. Titration of the reduced form of coenzyme Q with an alcoholic solution of $FeCl_3$-$\alpha,\alpha'$-dipyridyl served as the basis for determination of the equivalent weights reported in Table III. Using palladium on charcoal as the catalyst, as noted above, the moles of $H_2$ absorbed/mole of coenzyme Q are also reported in Table III for the various quinones.

TABLE III

| Coenzyme | Q-10 | Q-9 | Q-8 | Q-7 |
|---|---|---|---|---|
| Alkoxyl percent $CH_3$ | 6.78 | 7.95 | 8.33 | 9.79 |
| Equivalent Wt | 447 | 417 | 387 | 331 |
| Moles $H_2$/mole | 11.0 | 10.2 | 8.9 | 7.9 |

The molecular weights and empirical formulas given in Table I best fit the data available although the number of carbon atoms assigned to the formulas could be varied slightly without serious conflict with the analytical data. It is possible that the individual quinone compounds might also differ slightly in the branching on the side chain, in the number and position of the double bonds on the side chain as well as involve some geometrical isomerism along with various combinations of the same. It is also possible that the quinonoid nucleus contains two side chains with isoprene units instead of only one side chain which is isoprenoid in character.

The following examples will serve to illustrate the invention.

*Example 1.—From Beef Heart Mitochondria (Q-10)*

Step 1: *Saponification.*—About 1057 grams of beef heart mitochondrial protein were worked up batchwise in the following manner. One volume of an aqueous suspension (60–70 mg. protein/ml.) was added to two volumes of 10 percent KOH in 95 percent ethanol which contained an amount of pyrogallol equivalent in weight to the weight of mitochondrial protein. This mixture was then refluxed for about 30 minutes.

Step 2: *Extraction.*—The saponified mixture obtained as above was extracted three times each with one-sixth volume of heptane. The combined heptane extracts were then washed several times with distilled water until the pH of the aqueous extracts remained unchanged.

Step 3: *Evaporation.*—The washed heptane extract obtained as above was dried with anhydrous $Na_2SO_4$ and the heptane was distilled off in vacuo.

Step 4: *Removal of "Cholesterol Fraction."*—The product or residue obtained as above and containing the desired quinone compound contaminated with cholesterol and the like, was dissolved in 250 ml. of warm isooctane, and the resulting solution was held at about 5° C. for several days. The precipitate which formed was filtered with suction and washed with 50 ml. of cold isooctane. This precipitate was mainly cholesterol. The filtrate and washings were combined and the isooctane solution was placed at −20° C. overnight and the small amount of precipitate formed was filtered off and discarded.

Step 5: *Chromatography.*—This purification step was carried out in a column containing sodium aluminosilicate (Decalso 50/80 mesh). The Decalso was first washed with about 500 ml. of isooctane and the quinone isooctane concentrate obtained above in step 4 was then added to the column. Elution was carried out as follows collecting approximately 500 ml. fractions:

| Fraction No. | Solvent | Volume (ml.) | Description of Eluate |
| --- | --- | --- | --- |
| 1–3 | Isooctane | 1,250 | 1, 2: yellow color; 3: no color. |
| 4–8 | 5% ethyl ether-isooctane. | 2,750 | Main yellow color in 4, 5, 6; tailing off in 7, 8. |

The ether eluate contains the desired quinone and most of it appears in fractions 4–6.

*Rechromatography.*—The ether eluate (e.g. fractions 4, 5 and 6) can be rechromatographed in a second Decalso column as above, if desired, as follows:

| Fraction No. | Solvent | Volume (ml.) | Appearance |
| --- | --- | --- | --- |
| 1 | Isooctane | 500 | Colorless. |
| 2–4 | 5% ethyl ether-isooctane. | 1,500 | Single colored band main color in 2; 4 almost colorless. |

*Step 6: Final purification.*—Fractions 2 and 3 of the second column were concentrated in vacuo to oil. The oil was heated on a steam bath with 100 ml. of absolute ethanol and the hot ethanolic solution containing the quinone was separated by decantation from a small amount of insoluble brownish oil. A yellow precipitate formed in the ethanol solution after standing for about a day at 5° C. This precipitate was filtered off and recrystallized from 100 ml. of absolute ethanol after removing a very small amount of alcohol insoluble oil. The recrystallized Q–10 product had a melting point of about 49° C.

*Example II.—From Beef Heart Mitochondria Without Chromatography (Q–10)*

The beef heart mitochondria was saponified with 10 percent alcoholic KOH in the presence of pyrogallic acid as described above in step 1 of Example I. The first heptane extract (see step 2 of Example I) from the saponified mixture was evaporated and the residue taken up in ethanol leaving a red residue of ethanol insoluble material. The ethanolic solution containing the desired quinone was held at −15° C. overnight and the white crystals that formed (mainly cholesterol) were removed by filtration and discarded. The orange mother liquor was held at −15° C. for about 48–72 hours until the quinone crystallizes as orange crystals. The crystals are separated by decantation and redissolved in warm 100 percent ethanol. The red precipitate which forms at room temperature was removed by centrifugation and the ethanolic solution was held at −15° C. overnight. The orange crystals which formed were separated, redissolved in warm ethanol and again held at −15° C. overnight or until the mother liquor is colorless. The crystals of the desired Q–10 quinone after separation from the liquor had a melting point of about 45–47° C.

*Example III.—From Whole Beef Heart Tissue (Q–10)*

Beef heart tissue was trimmed of fat and connective tissue and passed through a meat grinder. For each pound of heart 600 ml. of 10 percent sodium hydroxide in 95 percent ethyl alcohol and 30 gm. of pyrogallic acid were added and the mixture refluxed in a water bath set at 90° C. for one-half hour. The resulting mixture was cooled and placed in a separatory funnel and extracted twice with approximately 100 ml. of heptane. The heptane extracts were pooled and washed three times with four volumes of distilled water. The washed heptane extract was then dried over anhydrous sodium sulfate for about two hours. The heptane was removed under reduced pressure with gentle heating by a slow stream of steam. The residue which consists of a thin white film overlaid with orange to yellow crystals was taken up in 20 ml. of ethyl alcohol and allowed to stand at 5° C. overnight. After removal of any precipitate that may form on standing, the alcohol was evaporated under reduced pressure with care to avoid extreme spattering in the final stages. The residue was taken up in a minimum volume of isooctane and cooled to −15° C. If any white platelets (cholesterol) form during this cooling step they are filtered off. The reddish orange isooctane solution was then placed on a column of sodium aluminosilicate (Decalso 50/80 mesh). (For an extract from 3 pounds of beef heart a column of 1¼ inches inside diameter by 8 inches long will suffice.) The column was washed with isooctane dried over sodium sulfate before addition of the extract.

The column was eluted with dried isooctane until the first yellow band (carotenes) had been completely eluted (about 300 ml. of isooctane should be sufficient). The quinone was then eluted from the column with 5 percent anhydrous ethyl ether in isooctane (the quinone can be identified as a yellow band and about 300 ml. of ether solution should be sufficient). Cholesterol and other impurities may appear in the eluate in the last yellow fractions or immediately thereafter, so the final tailing fractions of the quinone should not be mixed with the bulk of the material from the main portion of the yellow band. The yellow eluates which contain the main portion of the yellow quinone band were pooled and the solvent evaporated. The yellow oil remaining was taken up in a minimum volume of hot ethanol and allowed to stand at 5° C. overnight. The orange crystals which form on standing were removed by filtration and washed with cold (5° C.) ethanol. The crystals of the desired Q–10 quinone can be further purified if desired, by rechromatographing on Decalso or recrystallizing from ethanol or both. Additional material can also be recovered by reprocessing the mother liquor through a second chromatographic column in accordance with the procedure described above.

*Example IV.—From Azotobacter vinelandii (Q–8)*

This process was carried out in accordance with Example I except for the omission of step 4 and includes saponification, extraction, evaporation and chromatography of an isooctane concentrate as in Example I. The desired Q–8 quinone after crystallizing from ethanol, glacial acetic acid and methanol had a melting point of about 36.5–37.5. The melting point was not raised by further crystallizations. The infrared spectra of the Q–8 quinone obtained from Azotobacter and the Q–10 quinone obtained from beef heart material appear identical, and, except for the difference in melting point and for the fact that the Azotobacter quinone is more soluble in methanol, ethanol and glacial acetic acid, also appear to be one and the same.

*Example V.—From Torula (Q–7 and Q–9)*

*Step 1: Saponification.*—The following mixture was refluxed for 30 minutes: 1 liter 15 percent w./v. KOH in 95 percent ethanol, 37 g. pyrogallol and 330 g. of dried Torula powder (feed grade) slurried in 800 ml. water. Eight batches were refluxed in this manner.

*Step 2: Extraction.*—Each batch was extracted 3 times with 400 ml. volumes of isooctane in a separatory funnel. The last extract of one batch was used to extract a fresh batch. The pooled isooctane extracts were dried over anhydrous $Na_2SO_4$ and evaporated in vacuo to a volume of 500 ml. After standing overnight at −20° C., a precipitate formed and was discarded after centrifugation. The supernatant solution contained 8.15 g. of impure coenzyme Q, i.e. a mixture of Q–9 and Q–7.

*Step 3: Silicic acid chromatography.*—The material from step 2 was adsorbed on a column containing 300 g. of silicic acid and 150 g. of diatomaceous silica (Super-Cel) equilibrated with isooctane. The material was eluted with 1/1 (v./v.) chloroform/isooctane. The fractions containing coenzyme Q, which emerged as a deep orange band, were pooled and evaporated to dryness in vacuo.

Chromatography on Decalso columns also has been used successfully for this step, essentially as described in Example I.

*Step 4: Separation of Q–9 and Q–7 by reversed phase paper chromatography.*—The residue from the previous step was dissolved in 50 ml. of ethanol. This ethanolic solution was applied (1 mg. coenzyme Q/cm.) to Whatman No. 17 filter paper 4 cm. from the bottom. The paper had been previously treated with silicone (Dow Corning No. 550). The paper was then hung in the chromatography chamber and allowed to equilibrate with 7/3 (v./v.) n-propanol/$H_2O$ for about 24 hours. After the equilibration period the material was chromatographed in the ascending manner with the above-mentioned solvent system. When the solvent front had progressed 20 cm. or more two distinct yellow bands could be observed. The papers were then air dried and the appropriate bands were cut out. The upper and lower bands contained the low melting (Q–7) and high melting (Q–9) compounds, respectively. The quinones were separately eluted from the papers with warm ethanol until no color remained. The alcohol eluates were filtered to remove paper particles and then evaporated to dryness. The small amount of silicone which was now present was removed by silicic acid chromatography essentially as described in step 3 except that smaller columns were now used. From these columns were obtained the following: high melting Q–9 compound, 80 mg.; low melting Q–7 compound, 465 mg.

*Step 5: Final purification.* (a) *High melting compound.*—The Q–9 eluate from the silicic acid column was taken to dryness and the residue was dissolved in 10 ml. absolute ethanol. After a day at 5° C., a small amount of whitish precipitate had formed and was discarded after centrifugation. The supernatant was placed at —20° C. overnight. The yellow precipitate which had formed was centrifuged off and redissolved in 8 ml. of warm 1/1 (v./v.) methanol-ethanol and placed at 5° C. The yellow crystals which formed were recrystallized from 4 ml. of ethanol-methanol solution at room temperature. Yield: 44 mg. of Q–9, M.P. 43 to 45° C. More compound can be obtained from the mother liquors.

(b) *Low melting form.*—The Q–7 eluate from the silicic acid column was taken to dryness, the residue taken up in 36 ml. 4/1 (v./v.) ethanol/methanol and placed at 5° C. overnight. A small amount of colorless oil separated and was discarded after centrifugation. The supernatant was placed at —20° C. overnight. The yellow precipitate which formed was centrifuged and redissolved in 12 ml. 4/1 ethanol/methanol and placed at 5° C. for two days. The crystals were filtered off in the cold and recrystallized from 7 ml. of the ethanol-methanol solvent yielding 233 mg. of Q–7 crystals, M.P. 30° C. More material can be recovered from the various mother liquors.

*Example VI.—From* Beef Heart Mitochondria *(Q–10)*

*Direct extraction.*—Beef heart mitochondria in a suspension of about an equal volume of water was extracted with ten volumes of ethanol overnight at room temperature. The ethanol extract was then cooled and held at —15° C. overnight and the precipitate which formed was separated by filtration. The solvent was then evaporated from the extract and the residue was taken up in a minimum volume of petroleum ether (boiling point 30–60° C.). The petroleum ether extract was poured slowly into ten volumes of acetone and the precipitate removed by filtration. The acetone was evaporated and the acetone solubles were taken up in a minimum volume of heptane and placed on an acid washed chromatographic alumina column. The column was eluted with heptane until the carotenes (first yellow band) were removed. The column was then eluted with 2 percent ethyl ether in heptene until the second yellow band which contains the desired quinone is removed. The ether fractions were then rechromatographed on alumina, using the same procedure as above. The solvent from the fractions containing the quinone (i.e. the ether-heptane fractions) was removed and the remaining red oil dissolved in a minimum volume of warm acetic acid. On standing overnight at 5° C. orange crystals of Q–10 formed which after recrystallizing from acetic acid had a melting point of about 50° C.

*Example VII.—From* Torula utilis *(Q–9 and Q–7)*

*Direct extraction.*—The dry torula yeast was stirred intermittently with isooctane for about 1–2 days and then the yeast was allowed to settle and the yellow supernatant was siphoned off. Sufficient isooctane was used to provide a supernatant equivalent to about one-fifth the total volume of the suspension. The isooctane supernatant was placed on a Decalso (sodium aluminosilicate) column until the quinone started passing through when a new column was started. The quinone was eluted from each column with 5 percent ethyl ether in isooctane and the eluant concentrated to an orange oil. Chromatography using fuller's earth and the like can also be employed with further purification by crystallization from ethanol and the like as described above.

The coenzyme Q products obtained from torula upon fractional crystallization in methanol or ethanol, yield two closely related products as described above. Although one product (Q–9) was found to have a melting point after several recrystallizations of about 45.2° C. and the other product (Q–7) a melting point of about 30.5, both products had the same visible spectra and the same ultraviolet spectra characteristic of all coenzyme Q products. Coenzyme Q–6 can be obtained from the nonsaponifiable fraction of baker's yeast in accordance with Example V.

In the above examples, Examples I–V employ saponification and Examples VI and VII direct extraction. There is considerable evidence that coenzyme Q obtained by direct solvent extraction followed by purification through chromatography and crystallization is more efficient enzymatically than coenzyme Q isolated by a procedure involving saponification. Coenzyme Q–10 obtained from beef heart by direct extraction, for example, can be fully reduced in the presence of catalytic amounts of mitochondria, cyanide and succinate, whereas only a part of coenzyme Q–10 obtained from beef heart by saponification can be reduced enzymatically even though it is completely reducible chemically.

Coenzyme Q products are mild anti-coagulants, i.e. have slight anti-vitamin K activity. Extraction of coenzyme Q from mitochondria decreases succinoxidase activity and addition of coenzyme Q restores the initial activity. Crane et al., Biochim. Biophys. Acta., 25, 220 (1957). In view of this coenzyme Q can be used in assaying for succinic acid or the succinate radical and is a valuable laboratory tool for assays in this field. This can be readily done by extracting mitochondria with isooctane, adding coenzyme Q to the extracted mitochondria (which is now specific for the succinic acid or succinate radical) and then adding the sample to be tested. By measuring the oxygen uptake the amount as well as the presence of succinic acid or the succinate radical in the sample can be readily obtained. Coenzyme Q, as pointed out above, undergoes reversible oxidation and reduction and while derived from natural products neither the oxidized form nor the reduced form are known in nature. In this connection, it has been demonstrated that while crystalline coenzyme Q isolated in accordance with the examples is not water-soluble and has an ultra-violet absorption maxima at about 405 m$\mu$, that the coenzyme Q active factor as it occurs in lipoprotein in nature is water soluble and has the corresponding maxima at about 425 mµ. It has also been demonstrated that the coenzyme Q active factor as it occurs in lipoprotein in nature (apparently as a lipoprotein-coenzyme Q complex) is about five times as efficient as the crystalline coenzyme Q products of the present invention in the restoration of succinoxidase activity in isooctane extracted mitochondria. This figure of five times as efficient was also obtained by assaying in the presence of phospholipid although it is known that some phospholipid material from the lipoprotein facilitates the utilization of coenzyme Q by isooctane-extracted mitochondria.

Investigations to date have established that coenzyme Q may be represented by the following basic formula:

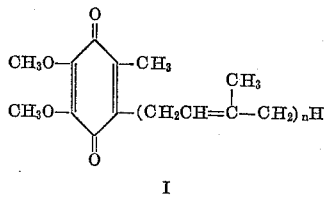

I where $n=6-10$. For $Q_{10}$, $n=10$, for $Q_6$, $n=6$, etc. The hydroquinone form of coenzyme Q and its derivatives may be represented by the following formula:

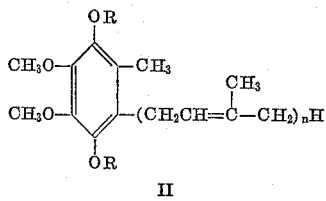

II where $n=6-10$, and R=H, Acyl, etc. The hydroquinone ($R=H$) can be prepared with $KBH_4$ reduction in ethanol as described above, and the preparation of acyl derivatives (R=acyl) from the hydroquinone (coenzyme Q in reduced form) can be prepared as described above in connection with the preparation of the diacetate ester.

Hydrogenated coenzyme Q (i.e. with the side chain saturated) can be prepared in the hydroquinone form with hydrogenation over a hydrogenation catalyst as described above. Hydrogenated coenzyme Q can also be prepared in the quinone form by the following process.

Hydrogenation of coenzyme $Q_{10}$ over Raney nickel catalyst in ether solution or over platinum catalyst in dioxane solution was carried out at 1 atmosphere pressure. Eleven molecular equivalents of hydrogen were absorbed giving the hydroquinone form of hydrogenated coenzyme Q of Formula III below (R=H, $n=10$). This compound was obtained as a colorless oil by filtration to remove the catalyst then evaporation to remove the solvent. The hydroquinone may be acetylated by treatment with a small excess of acetic anhydride. (Formula III, R=acyl.)

If the oily hydrogenation product is oxidized by treating it (in ether solution) with silver oxide, the eicosahydrocoenzyme of Formula IV below ($n=10$) is formed, $$\lambda^{isooctane}_{max.}\ 278\ m\mu\ E^{1\%}_{1\ cm.}\ 187.$$

*Analysis.*—Calcd. for $C_{59}H_{110}O_4$: C, 80.19; H, 12.55. Found: C, 80.30; H, 12.36.

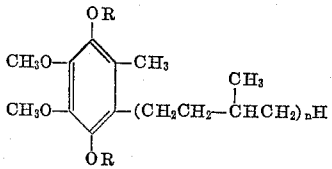

III

R=H, Acyl, etc., $n=6-10$.

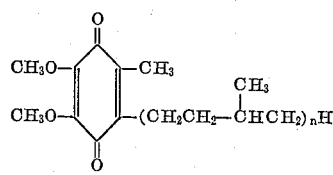

IV $n=6-10$.

In the above formulas, Formula I represents coenzyme Q or, as sometimes referred to, coenzyme Q in its oxidized or quinone form; and Formula II (R=H) represents coenzyme Q in its hydroquinone form or, as sometimes referred to, coenzyme Q in its reduced form. In both Formulas I and II the hydrocarbon side chain remains unsaturated. In Formulas III and IV the side chain is saturated and Formula III (R=H) represents hydrogenated coenzyme Q in its hydroquinone or reduced form, and Formula IV represents hydrogenated coenzyme Q in its quinone or oxidized form.

Coenzyme Q, as pointed out above, is thus characterized by a quinonoid nucleus which is further characterized by having, as substituents, two methoxy groups and a methyl group along with an unsaturated hydrocarbon chain on the quinone ring. The unsaturated hydrocarbon side chain, as shown by the data, can vary in length, and is characterized by the presence of a multiple of isoprene or like unsaturated groups. As far as known, this structure, i.e. the structure of coenzyme Q, represents a basically new type of substituted quinone. Derivatives can be made as shown by the fact that the hydroxyl groups of the reduced or hydroquinone form are reactive groups and can be readily acylated, e.g. converted to lower alkanoyl derivatives such as the diacetate described above. The side chain is also reactive as shown by its hydrogenation described above, and in addition to the resulting saturated side chain, other derivatives can be made in accordance with established chemistry involving the reaction of various reactants with unsaturated hydrocarbons.

The present application is a continuation-in-part of our application Serial No. 746,787, filed July 7, 1958, now abandoned.

We claim:

1. A product represented by the formula:

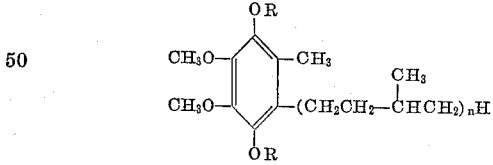

where $n=6-10$, and R is selected from the group consisting of hydrogen and lower alkanoyl groups.

2. A product represented by the formula:

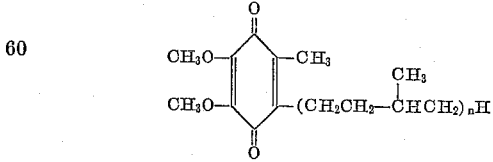

where $n=6-10$.

3. A process of preparing a tetra-substituted benzoquinone of the formula:

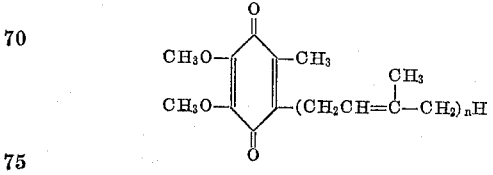

where $n=6$–$10$, which comprises saponifying materials with high respiratory rates selected from the group consisting of beef heart tissue including beef heart mitochondria, *Azotobacter vinelandii*, Torula and baker's yeast, in an aqueous ethanolic reaction mixture containing alkali metal hydroxide and pyrogallol, extracting the saponified mixture with a solvent selected from the group consisting of heptane and isooctane and recovering the tetra-substituted benzoquinone in the resulting extract.

4. The process of claim 3 where the tetra-substituted benzoquinone is chromatographed in isooctane solution and eluted with an ethereal solution of isooctane.

5. The process which comprises the direct extraction of the materials of claim 3 with ethanol and in which the resulting tetra-substituted benzoquinone is chromatographed as in claim 4.

References Cited in the file of this patent

Crane et al.: Biochem et Biophy. Acta, vol. 25, July 1957 (pages 220–221).

Crane et al.: Biochem et Biophy. Acta, vol. 22, 1956, pages 475–485.

Green et al.: J. Biol. Chem., vol. 217, pages 551–561 (1955).

Vischer: J. Chem. Soc., 1953, pages 815–820.